(12) United States Patent
Tang

(10) Patent No.: US 11,526,320 B2
(45) Date of Patent: Dec. 13, 2022

(54) MULTI-SCREEN INTERFACE CONTROL METHOD AND TERMINAL DEVICE

(71) Applicant: VIVO MOBILE COMMUNICATION CO., LTD., Dongguan (CN)

(72) Inventor: Junkun Tang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/380,029

(22) Filed: Jul. 20, 2021

(65) Prior Publication Data

US 2021/0349671 A1 Nov. 11, 2021

Related U.S. Application Data

(63) Continuation of application No. PCT/CN2020/073301, filed on Jan. 20, 2020.

(30) Foreign Application Priority Data

Jan. 21, 2019 (CN) .......................... 201910052676.8

(51) Int. Cl.
*G06F 3/14* (2006.01)
*G06F 3/0481* (2022.01)
*G06F 3/04845* (2022.01)

(52) U.S. Cl.
CPC .......... *G06F 3/1423* (2013.01); *G06F 3/0481* (2013.01); *G06F 3/04845* (2013.01)

(58) Field of Classification Search
None
See application file for complete search history.

(56) References Cited

U.S. PATENT DOCUMENTS

| 2014/0325428 | A1* | 10/2014 | Lee | G06F 3/0488 |
| | | | | 715/781 |
| 2014/0351748 | A1* | 11/2014 | Xia | G06F 3/0488 |
| | | | | 715/798 |
| 2017/0235435 | A1* | 8/2017 | Sohn | G06F 3/0481 |
| | | | | 715/738 |

FOREIGN PATENT DOCUMENTS

| CN | 104125332 | A | 10/2014 |
| CN | 104133629 | A | 11/2014 |
| CN | 104915144 | A | 9/2015 |
| CN | 104915173 | A | 9/2015 |
| CN | 105117099 | A | 12/2015 |
| CN | 108008890 | A | 5/2018 |
| CN | 108153504 | A | 6/2018 |
| CN | 108932092 | A | 12/2018 |

(Continued)

*Primary Examiner* — Mandrita Brahmachari
(74) *Attorney, Agent, or Firm* — IPX PLLC

(57) ABSTRACT

The embodiments of the present disclosure provide an object control method and a terminal device. The method includes: receiving a user's first input on a target manipulation control and a first object in a first screen, where an object in the target manipulation control is an object in a second screen, and the second screen is a screen, among at least two screens, other than the first screen; and executing, on the first screen and in response to the first input, a first action corresponding to the first input on the first object, where the first object is an object in the target manipulation control or an object in a target area, and the target area is an area on the first screen other than an area where the target manipulation control is located. The method may be applied to an object control scenario of a multi-screen terminal device.

15 Claims, 10 Drawing Sheets

(56) References Cited

FOREIGN PATENT DOCUMENTS

| CN | 108958580 | A |   | 12/2018 |   |   |
|----|-----------|---|---|---------|---|---|
| CN | 109032486 | A |   | 12/2018 |   |   |
| CN | 109164965 | A |   | 1/2019  |   |   |
| CN | 109194815 | A |   | 1/2019  |   |   |
| CN | 109213401 | A |   | 1/2019  |   |   |
| CN | 109522278 | A | * | 3/2019  | ............. | G06F 9/451 |
| CN | 109901760 | A |   | 6/2019  |   |   |

* cited by examiner

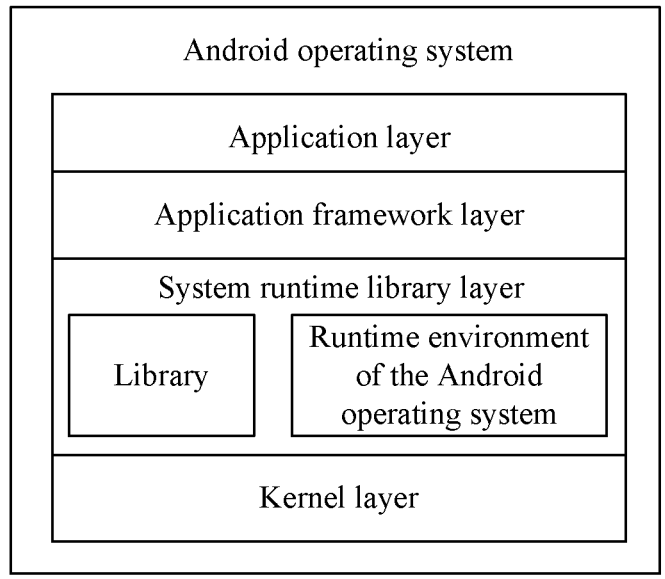

FIG. 1

A terminal device receives a user's first input on a target manipulation control and a first object in a first screen, where an object in the target manipulation control is an object on a second screen ~200

The terminal device executes, in response to the first input and on the first screen, a first action corresponding to the first input on the first object, where the first object is an object in the target manipulation control or an object in a target area, and the target area is an area on the first screen other than an area where the target manipulation control is located. ~201

FIG. 2

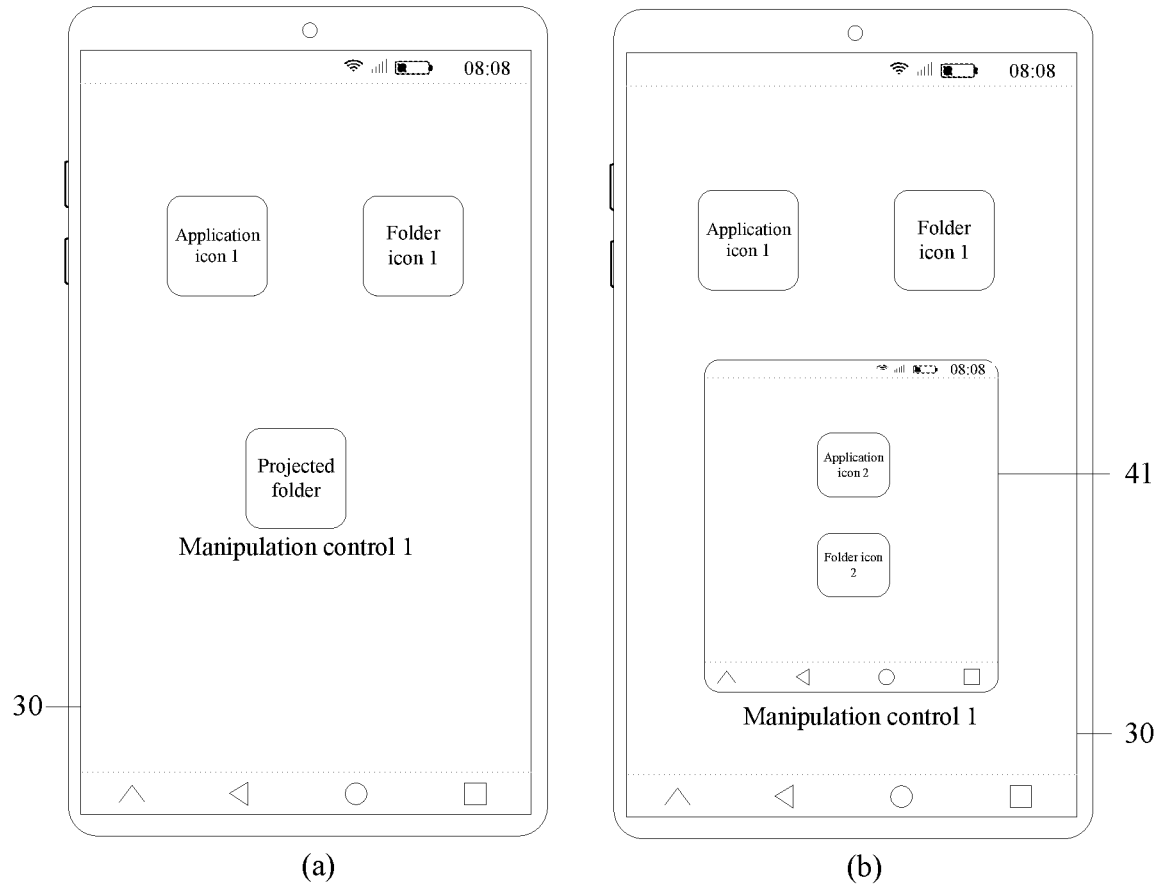

FIG. 10

A terminal device receives a user's first input on a target manipulation control and a first object in a first screen, where an object in the target manipulation control is an object on a second screen — 200

The terminal device executes, in response to the first input and on the first screen, a first action corresponding to the first input on the first object, where the first object is an object in the target manipulation control or an object in a target area, and the target area is an area on the first screen other than an area where the target manipulation control is located — 201

In response to the first input, the terminal device displays, on the second screen, a result of executing the first action on the first object — 204

MULTI-SCREEN INTERFACE CONTROL METHOD AND TERMINAL DEVICE

This application is a bypass continuation of PCT Application No. PCT/CN2020/073301 filed Jan. 20, 2020, which claims priority to Chinese Patent Application No. 201910052676.8, filed with the China National Intellectual Property Administration on Monday, Jan. 21, 2019, both of which are incorporated herein by reference in their entireties.

TECHNICAL FIELD

Embodiments of the present disclosure relate to the field of communications technologies, and in particular, to an object control method and a terminal device.

BACKGROUND

As the application scope of terminal devices becomes increasingly wider, the users' demand for a convenient use of multi-screen terminal devices is increasing.

Taking a dual-screen terminal device as an example, the dual-screen terminal device may display a first interface on a main screen and display a second interface on a sub screen. A user may make an input on an icon in the first interface displayed in the main screen to trigger the terminal device to execute an action corresponding to the input (for example, to change a position of the icon, to move the icon to a folder, or the like). The user may further make an input on an icon in the second interface displayed on the sub screen to trigger the terminal device to execute an action corresponding to the input (for example, to change a position of the icon, to move the icon to a folder, or the like).

However, as the first interface and the second interface are located on different screens of the dual-screen terminal device separately, if the user needs to perform a touch operation on both the first interface and the second interface, it is often necessary to switch between the main screen and the sub screen for many times. That results in poor convenience for the multi-screen terminal device to control objects in different screens.

SUMMARY

The embodiments of the present disclosure provide an object control method and a terminal device, to resolve the problem of poor convenience for an existing multi-screen terminal device to control objects in different screens.

To resolve the foregoing technical problem, the present disclosure is implemented as follows:

According to a first aspect, an embodiment of the present disclosure provides an object control method applied to a terminal device, where the terminal device includes at least two screens, and the method includes: receiving a user's first input on a target manipulation control and a first object in a first screen, where an object in the target manipulation control is an object in a second screen, and the second screen is a screen, among at least two screens, other than the first screen; and executing, on the first screen and in response to the first input, a first action corresponding to the first input on the first object, where the first object is an object in the target manipulation control or an object in a target area, and the target area is an area on the first screen other than an area where the target manipulation control is located.

According to a second aspect, an embodiment of the present disclosure provides a terminal device, where the terminal device includes at least two screens, and the terminal device may include a receiving module and a control module. The receiving module is configured to receive a user's first input on a target manipulation control and a first object in a first screen, where an object in the target manipulation control is an object on a second screen, and the second screen is a screen, among the at least two screens, other than the first screen. The control module is configured to execute, on the first screen and in response to the first input received by the receiving module, a first action corresponding to the first input on the first object. The first object is an object in the target manipulation control or an object in a target area, and the target area is an area on the first screen other than an area where the target manipulation control is located.

According to a third aspect, an embodiment of the present disclosure provides a terminal device, where the terminal device includes a processor, a memory, and a computer program stored in the memory and executable on the processor, where the computer program, when executed by the processor, implements the steps of the object control method according to the foregoing first aspect.

According to a fourth aspect, an embodiment of the present disclosure provides a computer-readable storage medium, where a computer program is stored in the computer-readable storage medium, and the computer program, when executed by a processor, implements the steps of the object control method according to the foregoing first aspect.

In the embodiments of the present disclosure, a user's first input on a target manipulation control and a first object in a first screen may be received, where an object in the target manipulation control is an object in a second screen, and the second screen is a screen, among at least two screens, other than the first screen; and a first action corresponding to the first input on the first object is executed on the first screen and in response to the first input, where the first object is an object in the target manipulation control or an object in a target area, and the target area is an area on the first screen other than an area where the target manipulation control is located. Through this solution, as a first screen includes a manipulation control corresponding to a second screen in the embodiments of the present disclosure, the manipulation control may be configured to trigger displaying the display interface of the second screen on the first screen, so that an object in the second screen may be directly controlled or operated on the first screen, and an interactive operation of objects or contents in the second screen or in the first screen between the first screen and the second screen may be implemented on the first screen. In this way, the embodiments of the present disclosure can improve the convenience for a multi-screen terminal device to control objects in different screens.

DESCRIPTION OF DRAWINGS

FIG. 1 is a schematic architectural diagram of a possible Android operating system according to an embodiment of the present disclosure;

FIG. 2 is a first schematic flowchart of an object control method according to an embodiment of the present disclosure;

FIG. 10 is a seventh schematic diagram of a user interface applicable to an object control method according to an embodiment of the present disclosure;

FIG. 11 is a third schematic diagram of an object control method according to an embodiment of the present disclosure;

DETAILED DESCRIPTION OF EMBODIMENTS

Figure 3:
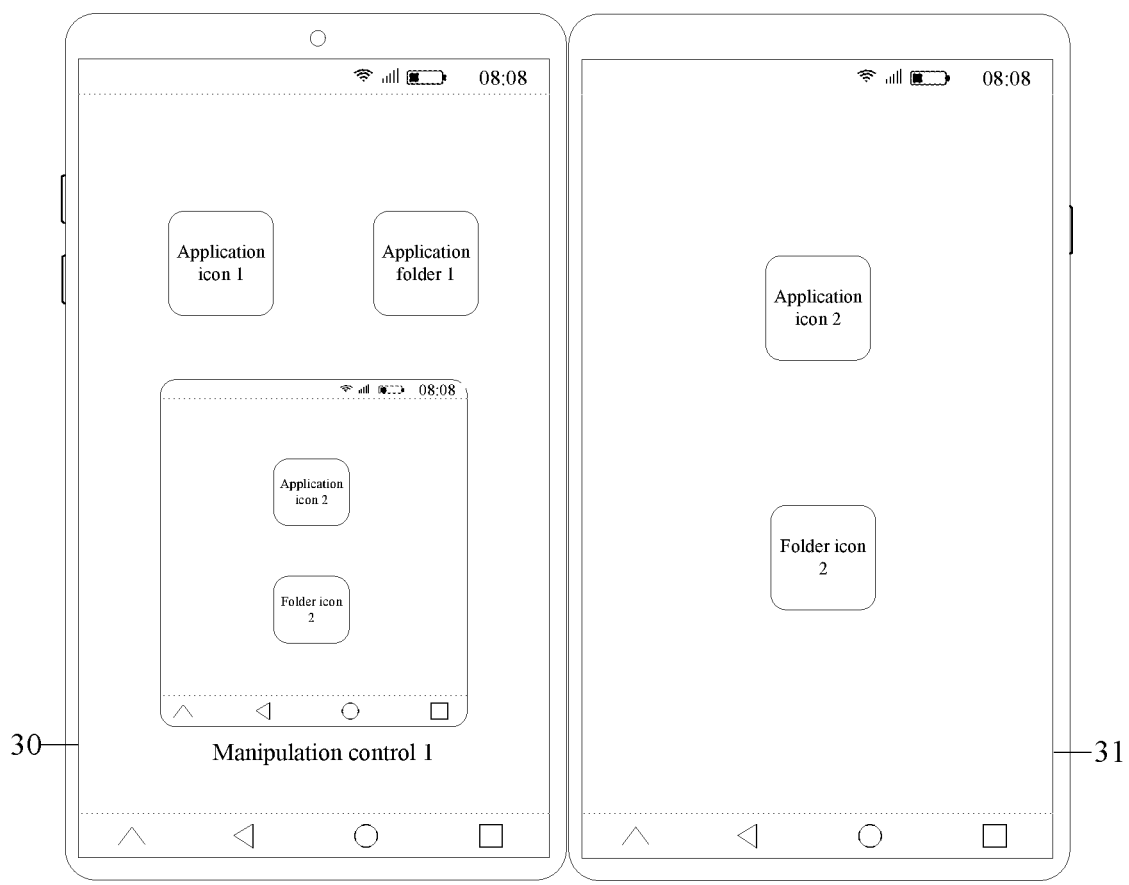
FIG. 3 is a first schematic diagram of a user interface applicable to an object control method according to an embodiment of the present disclosure.

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The term "and/or" in this specification describes an association relationship of associated objects, indicating that three relationships may exist. For example, A and/or B may indicate three cases: only A exists, both A and B exist, and only B exists. A character "/" in this specification indicates an "or" relationship between associated objects. For example, AB indicates A or B.

In the specification and claims of the present disclosure, the terms such as "first" and "second" are used to distinguish between different objects, but are not used to describe a particular sequence of the objects. For example, a first screen, a second screen, and the like are used to distinguish between different screens, but are not used to describe a particular sequence of the screens.

In the embodiments of the present disclosure, the term such as "exemplary" or "for example" is used to represent an example, an illustration, or a description. Any embodiment or design scheme described as "exemplary" or "for example" in the embodiments of the present disclosure should not be construed as being more preferred or advantageous than other embodiments or design schemes. To be precise, the use of the term "exemplary" or "for example" is intended to present a concept in a specific manner.

In the description of the embodiments of the present disclosure, unless otherwise specified, the meaning of "a plurality of" means two or more. For example, a plurality of processing units mean two or more processing units.

The embodiments of the present disclosure provide an object control method and a terminal device, where a user's first input on a target manipulation control and a first object in a first screen may be received, where an object in the target manipulation control is an object in a second screen, and the second screen is a screen, among at least two screens, other than the first screen; and a first action corresponding to the first input on the first object is executed on the first screen and in response to the first input, where the first object is an object in the target manipulation control or an object in a target area, and the target area is an area on the first screen other than an area where the target manipulation control is located. Through this solution, as a first screen includes a manipulation control corresponding to a second screen in the embodiments of the present disclosure, the manipulation control may be configured to trigger displaying the display interface of the second screen on the first screen, so that an object in the second screen may be directly controlled or operated on the first screen, and an interactive operation of objects or contents in the second screen or in the first screen between the first screen and the second screen may be implemented on the first screen. In this way, the embodiments of the present disclosure can improve the convenience for a multi-screen terminal device to control objects in different screens.

The terminal device provided in the embodiments of the present disclosure may be a terminal device with an operating system. The operating system may be an Android operating system, or may be an iOS operating system or other possible operating systems, which is not specifically limited in the embodiments of the present disclosure.

The following uses the Android operating system as an example to introduce a software environment applicable to the object control method provided by the embodiments of the present disclosure.

FIG. 1 is a schematic architectural diagram of a possible Android operating system according to an embodiment of the present disclosure. In FIG. 1, the architecture of the Android operating system includes 4 layers, namely: an application layer, an application framework layer, a system runtime library layer, and a kernel layer (specifically, it may be the Linux kernel layer).

The application layer includes various applications in the Android operating system (including system applications and third-party applications).

The application framework layer is the framework of applications. Developers can develop some applications based on the application framework layer while complying with the development principle of the application framework.

The system runtime library layer includes a library (further called a system library) and a runtime environment of the Android operating system. The library mainly provides various resources needed by the Android operating system. The runtime environment of the Android operating system is used to provide a software environment for the Android operating system.

The kernel layer is the operating system layer of the Android operating system and belongs to the lowest layer of software hierarchy of the Android operating system. The kernel layer provides core system services and hardware-related drivers for the Android operating system based on the Linux kernel.

The Android operating system is used as an example. In the embodiments of the present disclosure, based on the system architecture of the Android operating system as shown in FIG. 1, developers can develop software programs that implement the object control method provided by the embodiments of the present disclosure, so that the object control method can be performed based on the Android operating system as shown in FIG. 1. That is, by running the software program in the Android operating system, the processor or the terminal device can implement the object control method provided by the embodiments of the present disclosure.

The terminal device in the embodiments of the present disclosure may be a mobile terminal or a non-mobile terminal. Exemplarily, the mobile terminal may be a mobile phone, a tablet computer, a laptop, a PDA, an in-vehicle terminal, a wearable device, an ultra-mobile personal computer (UMPC), a netbook or a personal digital assistant (PDA), or the like, while the non-mobile terminals may be a personal computer (PC), a television (TV), a teller machine, an automatic teller machine, or the like, which is not specifically limited in the embodiments of the present disclosure.

An executor of the object control method provided by the embodiments of the present disclosure may be the foregoing terminal device, or may be a functional module and/or functional entity in the terminal device that can implement the object control method, which may be specifically determined based on an actual use need, and is not limited in the embodiments of the present disclosure. The following takes a terminal device as an example to provide exemplary description of the object control method provided by the embodiments of the present disclosure.

As shown in FIG. 2, an embodiment of the present disclosure provides an object control method, where the object control method may be applied to a multi-screen terminal device, and the object control method may include the following S200 and S201.

S200: The terminal device receives a user's first input on a target manipulation control and a first object in a first screen, where an object in the target manipulation control is an object on a second screen.

In the embodiment of the present disclosure, the multi-screen terminal device may include a first screen and another screen other than the first screen, and each screen may display its own interface (for example, a desktop or a display interface). In addition to at least one object (such as an application icon and a folder icon), a target manipulation control may further be displayed in a display interface of the first screen. The target manipulation control is a manipulation control corresponding to the second screen, and the second screen is a screen, among at least two screens, other than the first screen. In other words, the second screen is a screen corresponding to the target manipulation control among the foregoing at least one screen. The target manipulation control may be understood as a presentation mode in which an interface of the second screen or an object in the second screen is projected or mapped on the first screen. The object in the target manipulation control is the object in the second screen that is projected or mapped in the first screen.

In the embodiment of the present disclosure, the target manipulation control may be configured to trigger displaying the display interface of the second screen on the first screen, so that the embodiment of the present disclosure may directly control or operate, on the first screen, an object in the second screen, and may implement, on the first screen, an interactive operation of objects or contents in the second screen or in the first screen between the first screen and the second screen. For detailed description, refer to the following.

It should be noted that the display interface of the first screen includes but is not limited to one target manipulation control, and may further include multiple manipulation controls for sure. Each manipulation control in the multiple manipulation controls corresponds to a different screen in another screen. Each manipulation control in the manipulation controls is equivalent to the foregoing target manipulation control.

In the embodiment of the present disclosure, if a user wants to operate, in the first screen, an object in another screen, or interactively operate, in the first screen, an object (or content) between different screens of multiple screens, the user may input the target manipulation control and the first object (that is, the first input) in the first screen to trigger the terminal device to perform, in the first screen, an action corresponding to the input on the first object. For detailed description, refer to the following.

Optionally, in the embodiment of the present disclosure, the first screen may be a main screen of the multi-screen terminal device, and the other screens may be sub screens of the multi-screen terminal device; it is sure that the first screen may further be a sub screen of the multi-screen terminal device, and one of the other screens may be a main screen of the multi-screen terminal device. Specifically, that may be determined based on an actual use need, and the embodiment of the present disclosure imposes no limit on it.

For easy description and understanding, the following takes a dual-screen terminal device as an example to provide exemplary description of the object control method provided in the embodiments of the present disclosure. It is assumed that the dual-screen terminal device includes a first screen and a second screen, and the first screen is a main screen and the second screen is a sub screen.

FIG. 3 exemplarily illustrates a schematic diagram of a user interface applicable to an object control method according to an embodiment of the present disclosure. As shown in FIG. 3, the dual-screen terminal device may include a main screen 30 and a sub screen 31. In addition to at least one object (such as application icon 1 and folder icon 1, hereinafter referred to as main screen object), a manipulation control 1 corresponding to the sub screen 31 is further displayed in the main screen 30. The sub screen 31 includes an application icon 2 and a folder icon 2 (hereinafter referred to as sub screen objects). The manipulation control 1 includes the application icon 2 and the folder icon 2 as well, that is, objects in the manipulation control 1 and objects in the sub screen 31 are the same. It may be understood that the objects in the manipulation control 1 are the objects in the sub screen 31 that are projected or mapped in the main screen 30.

In the embodiment of the present disclosure, the foregoing target manipulation control is one of at least one manipulation control in the first screen. As shown in FIG. 3, the target manipulation control is the manipulation control 1 in the main screen 30.

Optionally, in the embodiment of the present disclosure, the foregoing first object may be an icon such as an application icon and a folder icon, a video playback window, a browser page, or any other possible object, which may be specifically determined based on an actual use need, and is not limited in the embodiments of the present disclosure.

Optionally, in the embodiment of the present disclosure, the foregoing first object may be an object in the target manipulation control. As shown in FIG. 3, the first object may be one of the application icon 2 and the folder icon 2.

Optionally, in the embodiment of the present disclosure, the foregoing first object may be one of at least one object in the first screen. As shown in FIG. 3, the first object may be one of the application icon 1 and the folder icon 1 in the main screen 30 (that is, the main screen object).

It may be understood that the object and the manipulation control in the foregoing first screen are all exemplary enumerations, that is, the embodiment of the present disclosure includes but is not limited to the various objects and manipulation controls enumerated above. In an actual implementation, the foregoing first screen may further include any other possible types or quantity of objects and manipulation controls, which may be specifically determined based on an actual use need, and is not limited in the embodiments of the present disclosure.

Optionally, in the embodiment of the present disclosure, the first input of the user may be a click input (such as a single-click input or a double-click input), a drag input, or any other possible form of input, which may be specifically determined based on an actual use need, and is not limited in the embodiments of the present disclosure.

S201: The terminal device executes, in response to the first input and on the first screen, a first action corresponding to the first input on the first object, where the first object is an object in the target manipulation control or an object in a target area, and the target area is an area on the first screen other than an area where the target manipulation control is located.

In the embodiment of the present disclosure, the foregoing first action may be specifically determined according to the user's first input on the target manipulation control and the first object. If the first object is different, the first input is different, and thus the first action is different. The following describes the object control method provided by the embodiment of the present disclosure in detail with respect to the first object being an object in the foregoing target manipulation control (the following first implementation) and the first object being an object in the foregoing target area (the following second implementation).

First Implementation

Optionally, in the first implementation, assuming that the foregoing first object is an object in the target manipulation control (that is, sub screen object), the foregoing first action may be any one of the following (a), (b), and (c):

(a) The terminal device displays an interface corresponding to the first object in an area corresponding to the target manipulation control.

In the embodiment of the present disclosure, assuming that the first input is specifically the user's input on the sub screen object (that is, the first object) in the target manipulation control, the terminal device may display, in response to the input, the secondary display an interface corresponding to the sub screen object in an area where the target manipulation control is located, which is equivalent to responding, on the main screen, to the user's input on the sub screen object. In this way, it is possible to directly operate, on the main screen, the object (or content) in the sub screen, thereby improving the operation convenience of the multi-screen terminal device.

Figure 4:
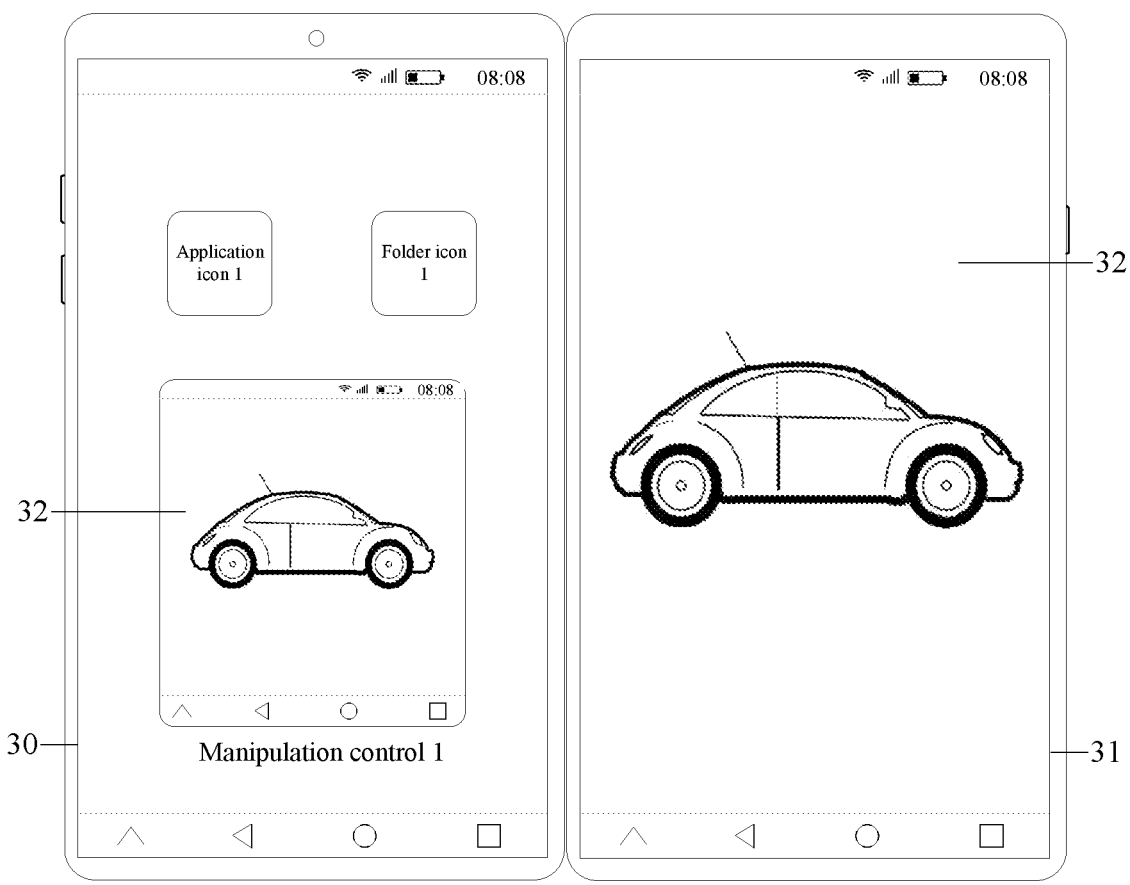
FIG. 4 is a second schematic diagram of a user interface applicable to an object control method according to an embodiment of the present disclosure.

Exemplarily, with reference to FIG. 3 and as shown in FIG. 4, assuming that the first object is the application icon 2 in the manipulation control 1, and the first input is the user's single-click input on the application icon 2, the terminal device may run, in response to the input, an application program corresponding to the application icon 2, and display an interface 32 of the application program in an area where the manipulation control 1 is located. In this way, it is possible to directly operate, in the main screen, an application icon in the sub screen.

Figure 5:
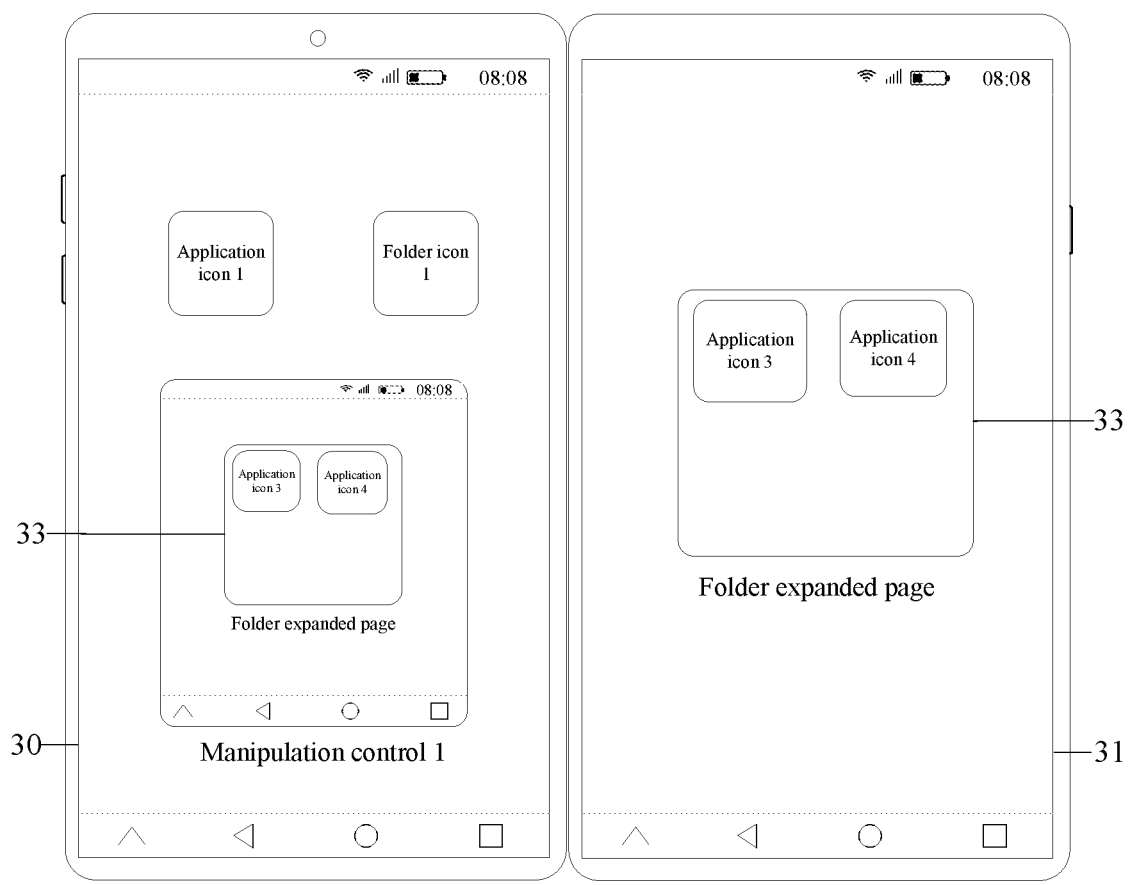
FIG. 5 is a third schematic diagram of a user interface applicable to an object control method according to an embodiment of the present disclosure.

For another example, with reference to FIG. 3 and as shown in FIG. 5, assuming that the first object is the folder icon 2 in the manipulation control 1, the terminal device may display, in response to the user's input on the folder icon 2, a folder expanded page 33 corresponding to the folder icon 2 in an area where the target manipulation control is located (in which the folder expanded page includes an application icon 3 and an application icon 4). In this way, it is possible to directly operate, in the main screen, a folder icon in the sub screen.

(b) The terminal device moves the first object from a first position in the target manipulation control to a second position in the target manipulation control.

In the embodiment of the present disclosure, assuming that the first input is specifically that the user drags the sub screen object (that is, the first object) from a first position in the target manipulation control to a second position in the target manipulation control, the terminal device may drag, in response to the input, the sub screen object from the first position in the target manipulation control to the second position in the target manipulation control, so as to change a position of the sub screen object in the target manipulation control, thus changing a position of the sub screen object in the sub screen, which is equivalent to moving the sub screen object in the sub screen. In this way, it is possible to directly operate, on the main screen, the object or content in the sub screen, thereby improving the operation convenience of the multi-screen terminal device.

Figure 6:
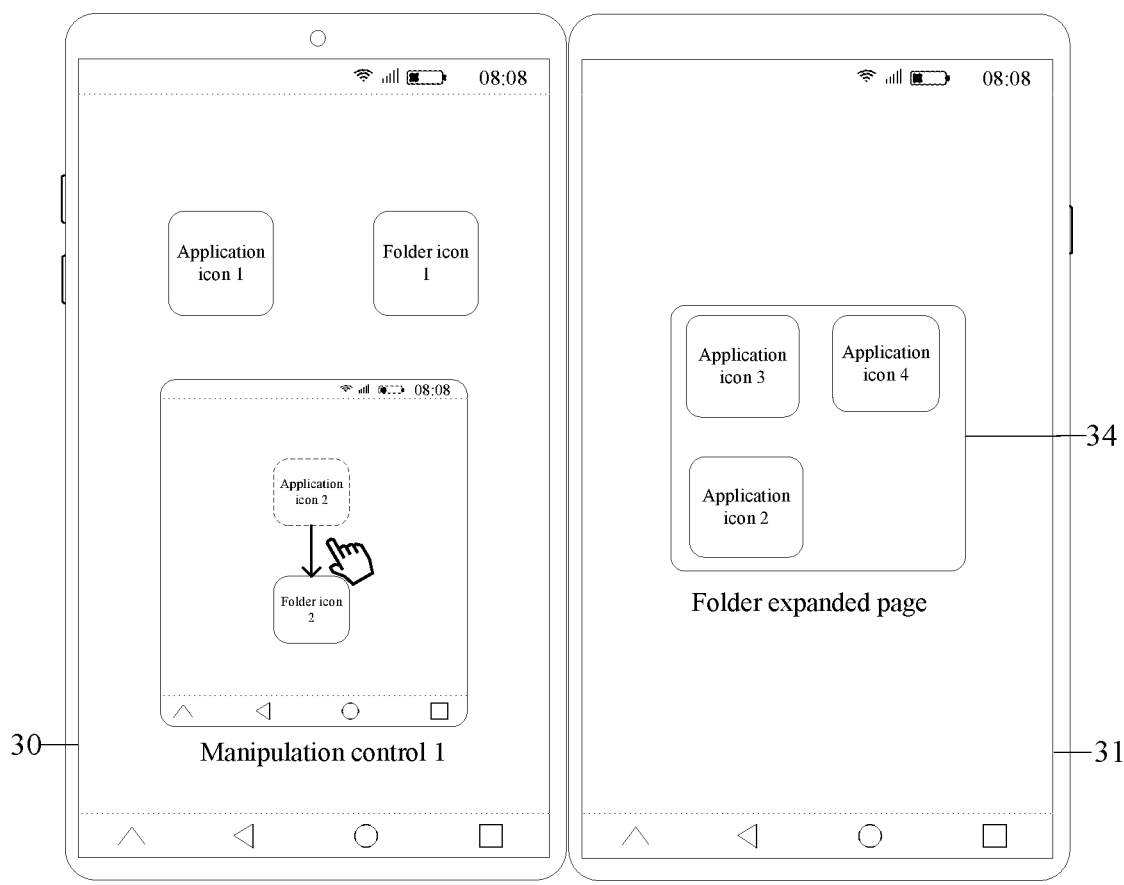
FIG. 6 is a fourth schematic diagram of a user interface applicable to an object control method according to an embodiment of the present disclosure.

Exemplarily, with reference to FIG. 3 and FIG. 5 and as shown in FIG. 6, assuming that the first object is the application icon 2 in the manipulation control 1, and the first input is an input of the user dragging the application icon 2 to an area where the folder icon 2 is located (that is, the foregoing target area), the terminal device may move, in response to the input, the application icon 2 to the folder icon 2. In this way, the folder icon 2 includes the application icon 2, the application icon 3, and the application icon 4. In this way, it is possible to directly operate, in the main screen, an object or content in the sub screen.

(c) The terminal device moves the first object from the target manipulation control to the target area.

In the embodiment of the present disclosure, assuming that the first input is specifically that the user drags the sub screen object (that is, the first object) from the target manipulation control to the target area of the main screen, the terminal device may drag, in response to the input, the sub screen object from the target manipulation control to the target area of the main screen, which is equivalent to moving the sub screen object from the sub screen to the main screen, so that the sub screen object becomes a main screen object. In this way, it is possible to interactively operate, in the main screen, an object or content between different screens, thereby improving the operation convenience of the multi-screen terminal device.

Figure 7:
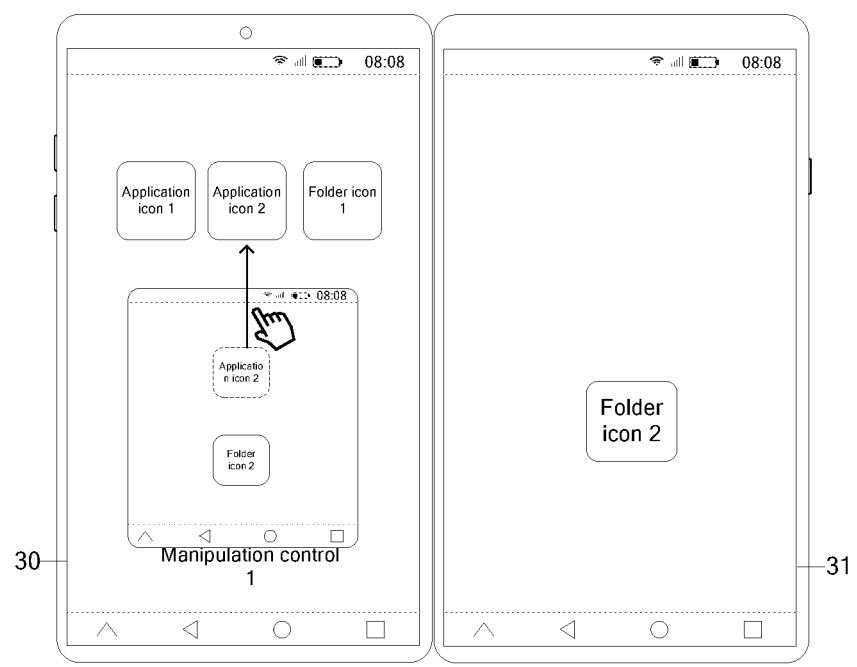
FIG. 7 is a fifth schematic diagram of a user interface applicable to an object control method according to an embodiment of the present disclosure.

Exemplarily, with reference to FIG. 3 and as shown in FIG. 7, assuming that the first object is the application icon 2 in the manipulation control 1, and the first input is an input of the user dragging the application icon 2 to a target area in the main screen 30, the terminal device may move, in response to the input, the application icon 2 from the manipulation control 1 to the main screen 30, so that the application icon 2 becomes a main screen object. In this way, it is possible to interactively operate, in the main screen, an object or content between different screens.

Second Implementation

In the second implementation, assuming that the foregoing first object is an object in the foregoing target area, the foregoing first action may include: moving, by the terminal device, the first object from the target area to the target manipulation control.

In the embodiment of the present disclosure, assuming that the first input is specifically that the user drags the main screen object (that is, the first object) from the target area in the main screen to the target manipulation control, the terminal device may drag, in response to the input, the main screen object from the target area in the main screen to the target manipulation control, which is equivalent to moving the main screen object from the main screen to the sub screen, so that the main screen object becomes a sub screen object. In this way, interactive operations of objects or contents in different screens can be completed in the main screen, thereby improving the operation convenience of the multi-screen terminal device.

Figure 8:
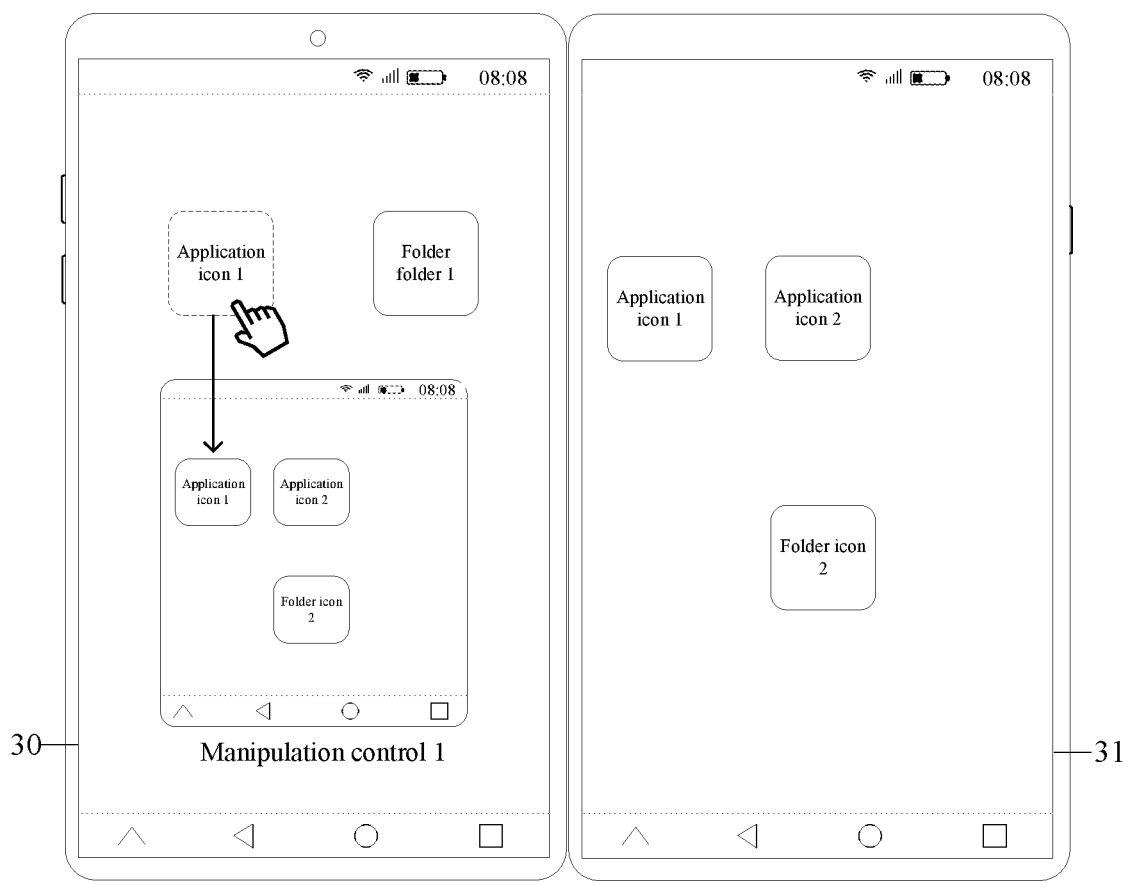
FIG. 8 is a sixth schematic diagram of a user interface applicable to an object control method according to an embodiment of the present disclosure.

Exemplarily, with reference to FIG. 3 and as shown in FIG. 8, assuming that the first object is the application icon 1 in the main screen 30, and the first input is an input of the user dragging the application icon 1 from the main screen 30 to the manipulation control 1, the terminal device may move, in response to the input, the application icon 1 from the main screen 30 to the manipulation control 1, which is equivalent to moving the application icon 1 from the main screen 30 to the sub screen 31, so that the application icon 1 becomes a sub screen object. In this way, it is possible to interactively operate, in the main screen, an object or content between different screens.

It may be understood that the foregoing first actions are all exemplary enumerations, that is, the embodiment of the present disclosure includes but is not limited to the foregoing enumerated actions. In an actual implementation, the foregoing first action may further include any other possible actions, which may be specifically determined based on an actual use need, and is not limited in the embodiments of the present disclosure.

In the embodiments of the present disclosure, (a) and (b) in the foregoing first implementation are specific implementations of internal operations of the manipulation control. It should be noted that the internal operations of the manipulation control are described above by using examples of triggering the display of the interface corresponding to the first object and moving the first object. It should be understood that the embodiment of the present disclosure includes but is not limited to the foregoing implementations. For example, the user may hold down an icon in the manipulation control to drag and adjust it to any area within the manipulation control to trigger a movement operation on the icon, or move an icon A to an icon B to trigger the generation of a folder, where the folder contains the icon A and icon B, or the like. These operations are similar to operating the sub screen directly in the main screen. Specifically, that may be determined based on an actual use need, and the embodiment of the present disclosure imposes no limit on it.

In the embodiments of the present disclosure, (c) in the foregoing first implementation and the second implementation are specific implementations of interactive operations on the sub screen object or the main screen object between the main screen and the sub screen. That is, move the sub screen object to the main screen or move the object in the main screen to the sub screen. In this way, the user may quickly operate, in the main screen, objects or contents in different sub screens, achieving the effect of fast switching between the main screen and the sub screen and content adjustment, which is convenient for operation and greatly improves the user experience.

The embodiments of the present disclosure provide an object control method, where a user's first input on a target manipulation control and a first object in a first screen may be received, where an object in the target manipulation control is an object in a second screen, and the second screen is a screen, among at least two screens, other than the first screen; and a first action corresponding to the first input on the first object is executed on the first screen and in response to the first input, where the first object is an object in the target manipulation control or an object in a target area, and the target area is an area on the first screen other than an area where the target manipulation control is located. Through this solution, as a first screen includes a manipulation control corresponding to a second screen in the embodiments of the present disclosure, the manipulation control may be configured to trigger displaying the display interface of the second screen on the first screen, so that an object in the second screen may be directly controlled or operated on the first screen, and an interactive operation of objects or contents in the second screen or in the first screen between the first screen and the second screen may be implemented on the first screen. In this way, the embodiments of the present disclosure can improve the convenience for a multi-screen terminal device to control objects in different screens.

Figure 9:
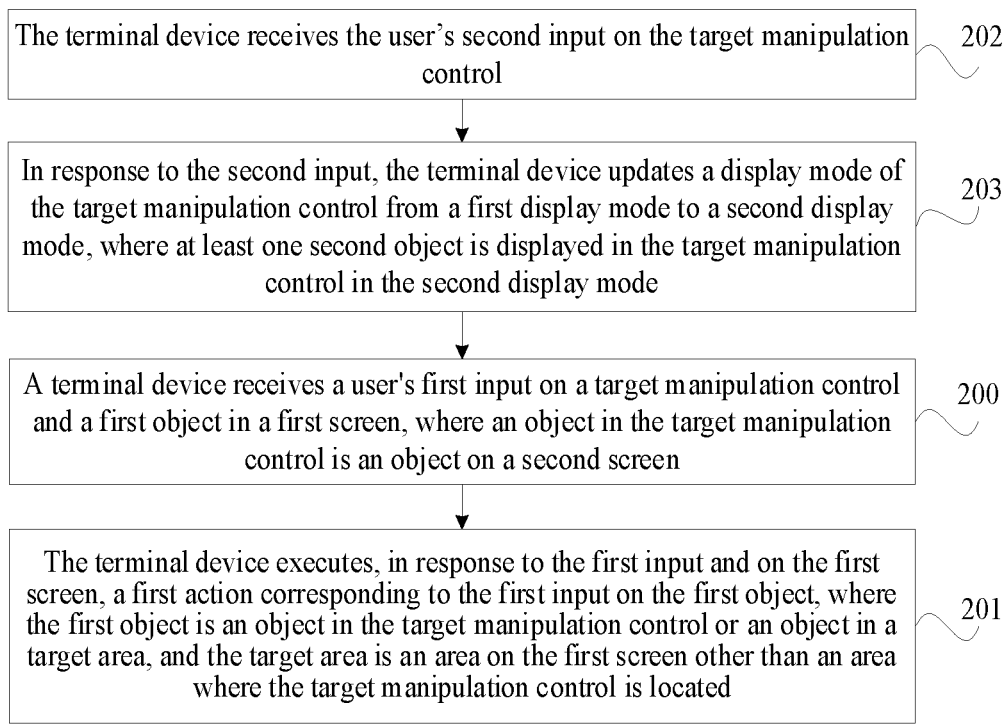
FIG. 9 is a second schematic diagram of an object control method according to an embodiment of the present disclosure.

Optionally, with reference to FIG. 2 and as shown in FIG. 9, prior to the foregoing S200, the object control method provided in the embodiment of the present disclosure may further include the following S202 and S203.

S202: The terminal device receives the user's second input on the target manipulation control.

In the embodiment of the present disclosure, if the user wants to operate the sub screen in the main screen, the user may make an input on the target manipulation control in the main screen to trigger displaying a display interface of a sub screen corresponding to the target manipulation control in the main screen (that is, a sub screen projection window), so that the user can trigger the terminal device to execute a corresponding action by operating on the display interface of the sub screen, thereby implementing, in the main screen, an operation on the sub screen.

Optionally, in the embodiment of the present disclosure, the foregoing second input of the user may be a click input (such as a single-click input or a double-click input), a hold-down input, or any other possible form of input, which may be specifically determined based on an actual use need, and is not limited in the embodiments of the present disclosure.

S203: In response to the second input, the terminal device updates a display mode of the target manipulation control from a first display mode to a second display mode, where at least one second object is displayed in the target manipulation control in the second display mode.

The foregoing at least one second object is an object in the foregoing second screen.

In the embodiment of the present disclosure, the display mode of the manipulation control may include the first display mode and the second display mode. The display mode of the manipulation control may be changed after the manipulation control is triggered. Specifically, the display mode of the manipulation control may be updated from the first display mode (that is, an initial state) to the second display mode, to display an object in the manipulation control (the foregoing second object); the display mode of the manipulation control may be updated from the second display mode to the first display mode, to cancel displaying an object in the manipulation control (that is, returning to the initial state).

Optionally, the foregoing target manipulation control in the first display mode may be a folder identifier (such as a folder icon), and the foregoing target manipulation control in the second display mode may be a display interface, and the display interface may be an interface that is of a sub screen corresponding to the target manipulation control and that is projected or mapped on the main screen, and the display interface may be understood as a folder expanded page of the folder identifier. Specifically, the foregoing target manipulation control in the first display mode may be referred to as a sub screen projected folder or a projected folder, and the foregoing target manipulation control in the second display mode may be referred to as an expanded page of a sub screen projected folder or an expanded page of a projected folder.

Specifically, the display mode of the manipulation control may be changed after the manipulation control is triggered. Specifically, the display mode of the manipulation control may be updated from the first display mode to the second display mode, to display or enter an expanded page of a projected folder; the display mode of the manipulation control may be updated from the second display mode to the first display mode, to cancel displaying or to exit an expanded page of a projected folder.

Optionally, in the embodiment of the present disclosure, the foregoing display interface may be displayed on the first screen in suspension, or may be displayed by being superimposed on a display interface of the first screen, which may be specifically determined based on an actual use need, and is not limited in the embodiments of the present disclosure. In addition, a shape and a size of the foregoing display interface may be determined based on an actual use need, which is not limited in the embodiments of the present disclosure.

As shown in (a) of FIG. 10, an initial state (that is, the first display mode) of the manipulation control 1 in the main screen 30 is represented as a projected folder. If the user makes an input on the manipulation control 1, as shown in (b) of FIG. 10, the terminal device may update, in response to the input, a display mode of the manipulation control 1 from a mode of a projected folder to a mode of expanded page 41 of a projected folder, where an object in the expanded page 41 of the projected folder is an object on a sub screen corresponding to the manipulation control 1.

In the embodiment of the present disclosure, in response to the user's input on the target manipulation control, the display mode of the target manipulation control may be changed, so that a display interface of the sub screen corresponding to the target manipulation control is displayed in the main screen. In this way, it is possible to directly operate, in the main screen, an object or content in the sub screen, or it is possible to interactively operate, in the main screen, an object or content between different screens, thereby improving the operation convenience of the multi-screen terminal device.

Based on the foregoing S202 and S203, the following describes a specific implementation of moving a sub screen object from a sub screen projected folder to the main screen.

Specifically, as the sub screen projected folder belongs to a type of a folder in the main screen, an object in the sub screen projected folder (that is, sub screen object) may be directly dragged to the main screen according to a folder operation strategy, so that the sub screen object becomes a main screen object. Based on the projection and nesting of a folder and from the perspective of a main screen desktop, an expanded page of the sub screen projected folder is equivalent to an expanded page of an ordinary folder, and from the perspective of a sub screen desktop, a boundary of an expanded page of the sub screen projected folder is equivalent to a boundary of the sub screen. Therefore, dragging an object in the sub screen projected folder through the boundary of the expanded page of the sub screen projected folder to the main screen can implement an operation of moving the object from the sub screen desktop to the main screen desktop.

Exemplarily, if it is required to drag the application icon 3 in the folder icon 2 in the sub screen projected folder to the main screen, first drag the application icon 3 from the folder icon 2 to an expanded page of the sub screen projected folder, and then continue to drag the application icon 3 out of the sub screen projected folder through a boundary of the expanded page of the sub screen projected folder. In this way, the icon is moved from the sub screen projected folder to the main screen, so that the sub screen icon is moved to the main screen, and a sub screen object becomes a main screen object.

The following describes, based on the foregoing S202 and S203 again, a specific implementation of moving a main screen object from the main screen to a sub screen projected folder.

Specifically, if the user holds down, in the main screen, the application icon 1 in the main screen to drag it to the sub screen projected folder, the terminal device may display an expanded page of the sub screen projected folder, and then the user may drag the application icon 1 to pass through a boundary of the expanded page of the sub screen projected folder to reach any area in the sub screen projected folder (including a resident bar for folder and the like), so that the main screen icon can be moved from the main screen to the sub screen projected folder, thereby moving the main screen icon to the sub screen and making a main screen object become a sub screen object. Further, the user may drag the application icon 1 to a folder icon in the sub screen projected folder.

It should be noted that the foregoing description takes the target manipulation control in the first display mode as a folder identifier as an example. It can be understood that the embodiment of the present disclosure includes but is not limited to the foregoing first display mode, and the target manipulation control in the first display mode may further be presented in any other possible display modes, which may be specifically determined based on an actual use need, and is not limited in the embodiments of the present disclosure.

In the embodiment of the present disclosure, by displaying a special folder in the main screen as a sub screen projected folder, the user may make an input on the sub screen projected folder to trigger displaying an expanded page of the sub screen projected folder, that is, displaying a display page of the sub screen, so that the user can operate the sub screen like an ordinary folder, thereby implementing content interaction between the sub screen desktop and the main screen desktop.

Optionally, in the embodiment of the present disclosure, the terminal device may quickly display (that is, enter) or cancel displaying (that is, exit) an expanded page of the sub screen projected folder in response to the user's input on the first screen (hereinafter referred to as shortcut gesture input).

Exemplarily, the first input may be a multi-finger (for example, two-finger) zoom-in gesture input, which is used to trigger any display interface in the main screen to enter an expanded page of a sub screen projected folder. Similarly, the first input may be a multi-finger (for example, two-finger) zoom out gesture input, which is used to trigger exiting from an expanded page of a sub screen projected folder and quickly return to a display interface of the main screen. In this way, the user can trigger a quick entry into or exit from the expanded page of the sub screen projected folder, without searching for an icon of the sub screen projected folder in the main screen nor making an input on the sub screen projected folder, thereby improving the convenience of the user's operation.

In the embodiment of the present disclosure, as a sub-interface is a display interface of the sub-screen projected or mapped in the main screen, a same navigation bar as that in the display interface of the sub-screen may be displayed in the sub-interface, where the navigation bar may include a functional key such as a return key (that is, return key) and/or a homepage key (that is, homepage key). The terminal device may respond, on the display interface of the sub screen (that is, the sub-interface), to the user's input on the functional key in the sub-interface, or respond, on the display interface of the main screen, to the user's input on the functional key in the sub-interface, which may be specifically determined based on a software strategy and is not limited in the embodiments of the present disclosure.

Exemplarily, the terminal device may update, in response to the user's input on the homepage key in the sub-interface, the sub-interface to the main interface of the sub-screen to display. In this case, if the user wants to return to the main interface of the main screen, the user may make a multi-finger zoom out gesture input on the first screen, to trigger the terminal device to cancel the main interface of the sub screen and display the main interface of the main screen.

For another example, in response to the user's input on the homepage key in the sub-interface, the terminal device may cancel displaying the expanded page of the sub screen projected folder, and display the main interface of the main screen.

Optionally, with reference to FIG. 2 and as shown in FIG. 11, after the foregoing S200, the object control method provided in the embodiment of the present disclosure may further include the following S204.

S204: In response to the first input, the terminal device displays, on the second screen, a result of executing the first action on the first object.

In the embodiment of the present disclosure, in response to the user's first input on the target manipulation control and the first object in the first screen, the terminal device may execute, on the first screen, the first action corresponding to the first input on the first object, and display, on the second screen corresponding to the target manipulation control, the result of executing the first action on the first object.

Exemplarily, with reference to the foregoing FIG. 6, assuming that the first object is the application icon 2 in the manipulation control 1, and the first input is an input of the user dragging the application icon 2 to an area where the folder icon 2 is located, the terminal device may move, in response to the input, the application icon 2 to the folder icon 2 (that is, the foregoing first action), and display, on the sub screen 31 corresponding to the manipulation control 1, the result of executing the first action on the application icon 2, that is, a folder expanded page 34 of the folder icon 2 includes the application icon 2, the application icon 3, and the application icon 4.

It should be noted that the foregoing exemplary description takes an example that the folder expanded page is the display result, on the sub screen 31, of executing the first action on the application icon 2. The embodiments of the present disclosure are not limited to the foregoing the display result on the sub screen 31, for example, the display result on the sub screen 31 may be the folder icon 2 instead of the folder expanded page 34 of the folder icon 2. Specifically, that may be determined based on an actual use need, and the embodiment of the present disclosure imposes no limit on it.

Through this solution, a display interface of the sub screen may be displayed on the main screen, so that an object in the sub screen may be operated directly on the main screen, and interaction of a sub screen object or a main screen object between the main screen and the sub screen may be implemented by operating an object in the main screen or an object in the sub screen.

It should be noted that the embodiment of the present disclosure may not limit a sequence of executing S201 and S204. That is, the embodiment of the present disclosure may execute S201 first, and then execute S204; execute S204 first, and then execute S201; or execute S201 and S204 at the same time. It may be understood that the foregoing FIG. 11 is an example of executing S201 first and then executing S204.

It should be noted that icon projection is taken as an example for description in the embodiment of the present disclosure. It may be understood that the embodiment of the present disclosure includes but is not limited to the foregoing object projection method. The object projection method may further include theme projection, setting interface projection, and video interface projection, browser page projection, and the like, which may be specifically determined based on an actual use need, and is not limited in the embodiment of the present disclosure.

Figure 12:
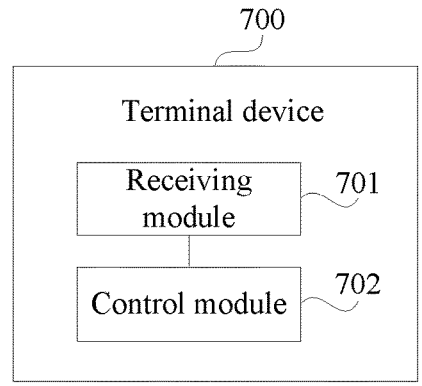
FIG. 12 is a schematic structural diagram of a terminal device according to an embodiment of the present disclosure.

As shown in FIG. 12, an embodiment of the present disclosure provides a terminal device 700, where the terminal device 700 includes at least two screens, and the terminal device 700 may include a receiving module 701 and a control module 702. The receiving module 701 is configured to receive a user's first input on a target manipulation control and a first object in a first screen, where an object in the target manipulation control is an object on a second screen, and the second screen is a screen, among the at least two screens, other than the first screen. The control module 702 is configured to execute, on the first screen and in response to the first input received by the receiving module 701, a first action corresponding to the first input on the first object. The first object is an object in the target manipulation control or an object in a target area, and the target area is an area on the first screen other than an area where the target manipulation control is located.

Optionally, in the embodiment of the present disclosure, an object in one manipulation control among the foregoing at least one manipulation control is an object on a screen corresponding to the one manipulation control.

Optionally, in the embodiment of the present disclosure, the foregoing first object may be an object in a target manipulation control, and the foregoing first action may include any one of the following: displaying an interface corresponding to the first object in an area corresponding to the target manipulation control, moving the first object from the target manipulation control to a target area, and moving the first object from a first position in the target manipulation control to a second position in the target manipulation control.

Optionally, in the embodiment of the present disclosure, the foregoing first object may be an object in a target area, and the foregoing first action may include: moving the first object from the target area to a target manipulation control.

Optionally, in the embodiment of the present disclosure, the control module 702 is further configured to display, in the foregoing second screen after the receiving module 701 receives a user's first input on a target manipulation control and a first object in a first screen and in response to the first input, a result of executing the first action on the first object.

Optionally, in the embodiment of the present disclosure, the receiving module 701 is further configured to receive the user's second input on the target manipulation control before receiving the user's first input on the target manipulation control and the first object in the first screen. The control module 702 is further configured to update, in response to the second input received by the receiving module 701, a display mode of the target manipulation control from a first display mode to a second display mode, where at least one second object is displayed in the target manipulation control in the second display mode, and the at least one second object is an object in the second screen.

Optionally, in the embodiment of the present disclosure, the foregoing target manipulation control in the first display mode is a folder identifier, and the target manipulation control in the second display mode is a display interface.

The terminal device provided in this embodiment of the present disclosure can implement the processes that are implemented by the terminal device in the foregoing method embodiment. To avoid repetition, details are not described herein again.

The terminal device according to the embodiment of the present disclosure may receive a user's first input on a target manipulation control and a first object in a first screen, where an object in the target manipulation control is an object in a second screen, and the second screen is a screen, among at least two screens, other than the first screen; and execute, on the first screen and in response to the first input, a first action corresponding to the first input on the first object, where the first object is an object in the target manipulation control or an object in a target area, and the target area is an area on the first screen other than an area where the target manipulation control is located. Through this solution, as a first screen includes a manipulation control corresponding to a second screen in the embodiments of the present disclosure, the manipulation control may be configured to trigger displaying the display interface of the second screen on the first screen, so that an object in the second screen may be directly controlled or operated on the first screen, and an interactive operation of objects or contents in the second screen or in the first screen between the first screen and the second screen may be implemented on the first screen. In this way, the embodiments of the present disclosure can improve the convenience for a multi-screen terminal device to control objects in different screens.

Figure 13:
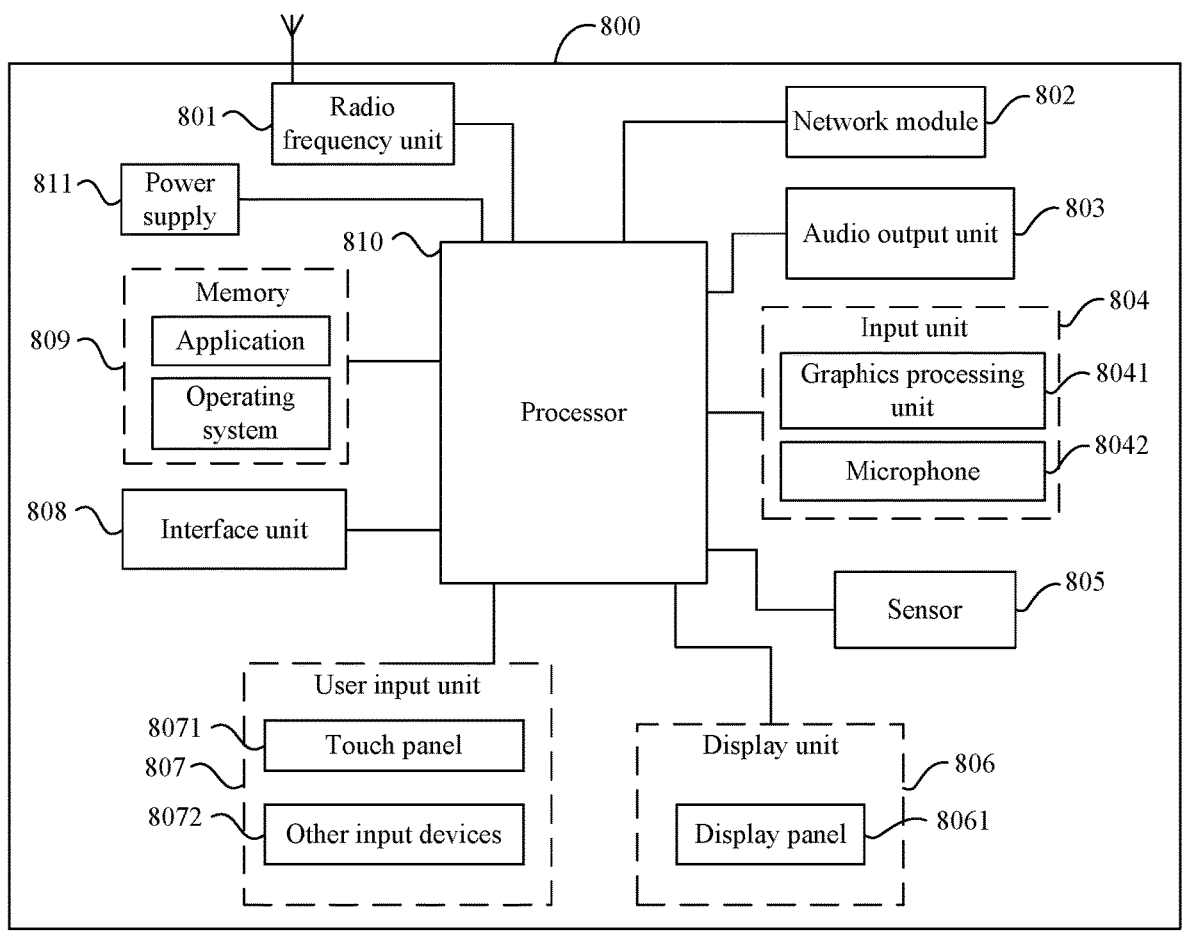
FIG. 13 is a schematic diagram of hardware of a terminal device according to an embodiment of the present disclosure.

FIG. 13 is a schematic diagram of a hardware structure of a terminal device according to embodiments of the present disclosure. As shown in FIG. 13, the terminal device 800 includes but is not limited to: a radio frequency unit 801, a network module 802, an audio output unit 803, an input unit 804, a sensor 805, a display unit 806, a user input unit 807, an interface unit 808, and a memory 809, a processor 810, a power supply 811, and the like. A person skilled in the art may understand that the structure of the terminal device shown in FIG. 13 does not constitute a limitation to the terminal device. The terminal device may include more or fewer components than that shown in the figure, or a combination of some components, or an arrangement of different components. In the embodiment of the present disclosure, the terminal device includes but is not limited to a mobile phone, a tablet computer, a notebook computer, a palmtop computer, a vehicle-mounted terminal, a wearable device, a pedometer, or the like.

In the embodiments of the present disclosure, the user input unit 807 is configured to receive a user's first input on a target manipulation control and a first object in a first screen, where an object in the target manipulation control is an object on a second screen, and the second screen is a screen, among the at least two screens, other than the first screen; the processor 810 is configured to execute, on the first screen and in response to the first input received by the user input unit 807, a first action corresponding to the first input on the first object. The first object is an object in the target manipulation control or an object in a target area, and the target area is an area on the first screen other than an area where the target manipulation control is located.

The embodiments of the present disclosure provide a terminal device, where the terminal device may receive a user's first input on a target manipulation control and a first object in a first screen, where an object in the target manipulation control is an object in a second screen, and the second screen is a screen, among at least two screens, other than the first screen; and execute, on the first screen and in response to the first input, a first action corresponding to the first input on the first object, where the first object is an object in the target manipulation control or an object in a target area, and the target area is an area on the first screen other than an area where the target manipulation control is located. Through this solution, as a first screen includes a manipulation control corresponding to a second screen in the embodiments of the present disclosure, the manipulation control may be configured to trigger displaying the display interface of the second screen on the first screen, so that an object in the second screen may be directly controlled or operated on the first screen, and an interactive operation of objects or contents in the second screen or in the first screen between the first screen and the second screen may be implemented on the first screen. In this way, the embodiments of the present disclosure can improve the convenience for a multi-screen terminal device to control objects in different screens.

It should be understood that in this embodiment of the present disclosure, the radio frequency unit 801 may be configured to receive and transmit information, or receive and transmit signals during a call. Specifically, the radio frequency unit 801 receives downlink data from a base station, and transmits the downlink data to the processor 810 for processing; and in addition, transmits uplink data to the base station. Usually, the radio frequency unit 801 includes, but not limited to, an antenna, at least one amplifier, a transceiver, a coupler, a low noise amplifier, and a duplexer. In addition, the radio frequency unit 801 may communicate with a network and another device by using a wireless communications system.

The terminal device 800 provides users with wireless broadband Internet access through the network module 802, such as helping users to send and receive emails, browse web pages, and access streaming media.

The audio output unit 803 may convert audio data received by the radio frequency unit 801 or the network module 802 or stored in the memory 809 into an audio signal, and output the audio signal as sound. In addition, the audio output unit 803 may further provide audio output (for example, call signal receiving sound or message receiving sound) related to a specific function performed by the terminal device 800. The audio output unit 803 includes a speaker, a buzzer, a telephone receiver, and the like.

The input unit 804 is configured to receive audio or video signals. The input unit 804 may include a graphics processing unit (GPU) 8041 and a microphone 8042. The graphics processing unit 8041 processes image data of a still picture or video acquired by an image capturing apparatus (for example, a camera) in a video capturing mode or an image capturing mode. A processed image frame can be displayed on the display unit 806. The image frame processed by the graphics processing unit 8041 may be stored in the memory 809 (or another storage medium) or sent by using the radio frequency unit 801 or the network module 802. The microphone 8042 may receive sound and can process the sound into audio data. Processed audio data may be converted, in telephone call mode, into a format that may be sent to a mobile communication base station via the radio frequency unit 801 for output.

The terminal device 800 further includes at least one sensor 805, such as a light sensor, a motion sensor, and other sensors. Specifically, the optical sensor includes an ambient light sensor and a proximity sensor. The ambient light sensor may adjust luminance of the display panel 8061 based on brightness of ambient light. The proximity sensor may turn off the display panel 8061 and/or backlight when the terminal device 800 approaches an ear. As a motion sensor, an accelerometer sensor may detect magnitude of acceleration in various directions (usually three axes), may detect magnitude and the direction of gravity when stationary, may be configured to identify postures of the terminal device (such as horizontal and vertical screen switch, related games, and magnetometer posture calibration), may perform functions related to vibration identification (such as a pedometer and a knock), and the like. The sensor 805 may further include a fingerprint sensor, a pressure sensor, an iris sensor, a molecular sensor, a gyroscope, a barometer, a hygrometer, a thermometer, an infrared sensor, or the like. Details are not described herein.

The display unit 806 is configured to display information input by the user or information provided to the user. The display unit 806 may include a display panel 8061, and the display panel 8061 may be configured in a form of a liquid crystal display (LCD), an organic light-emitting diode (OLED), or the like.

The user input unit 807 may be configured to receive input numeric or character information, and generate key signal inputs related to user settings and function control of the terminal device. Specifically, the user input unit 807 includes a touch panel 8071 and other input devices 8072. The touch panel 8071 is further referred to as a touchscreen, and may collect a touch operation performed by a user on or near the touch panel 8071 (such as an operation performed by a user on the touch panel 8071 or near the touch panel 8071 by using any proper object or accessory, such as a finger or a stylus). The touch panel 8071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 810, and can receive and execute a command sent by the processor 810. In addition, the touch panel 8071 can be implemented in various types such as resistive, capacitive, infrared, and surface acoustic waves. The user input unit 807 may further include other input devices 8072 in addition to the touch panel 8071. Specifically, the other input devices 8072 may include but are not limited to a physical keyboard, a function key (such as a volume control key or a power on/off key), a trackball, a mouse, a joystick, and the like. Details are not described herein.

Further, the touch panel 8071 can cover the display panel 8061. When detecting a touch operation on or near the touch panel 8071, the touch panel 8071 transmits the touch operation to the processor 810 to determine a type of a touch event. Then the processor 810 provides a corresponding visual output on the display panel 8061 based on the type of the touch event. Although in FIG. 13, the touch panel 8071 and the display panel 8061 are configured as two independent components to implement input and output functions of the terminal device, in some embodiments, the touch panel 8071 and the display panel 8061 can be integrated to implement the input and output functions of the terminal device. Details are not limited herein.

The interface unit 808 is an interface for connecting an external apparatus to the terminal device 800. For example, the external apparatus can include a wired or wireless headphone port, an external power supply (or a battery recharger) port, a wired or wireless data port, a memory card port, a port for connection with an apparatus having an identification module, an audio input/output (I/O) port, a video I/O port, an earphone port, and the like. The interface unit 808 may be configured to receive an input (for example, data information and power) from the external apparatus and transmit the received input to one or more elements in the terminal device 800, or transmit data between the terminal device 800 and the external apparatus.

The memory 809 may be configured to store a software program and various data. The memory 809 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 809 may include a high-speed random access memory, and may further include a non-volatile memory such as at least one magnetic disk storage component, a flash memory component, or another volatile solid-state storage component.

The processor 810 is a control center of the terminal device. The processor 810 uses various interfaces and lines to connect all parts of the entire terminal device, and performs various functions and data processing of the terminal device by running or executing the software program and/or module stored in the memory 809 and invoking data stored in the memory 809, thereby performing overall monitoring on the terminal device. The processor 810 may include one or more processing units. Optionally, the processor 810 may integrate an application processor and a modem processor. The application processor mainly deals with an operating system, a user interface, and an application program. The modem processor mainly deals with wireless communication. It may be understood that alternatively, the modem processor may not be integrated into the processor 810.

The terminal device 800 may further include the power supply 811 (such as a battery) supplying power to each component. Preferably, the power supply 811 may be logically connected to the processor 810 by using a power management system, so as to implement functions such as charging management, discharging management and power consumption management by using the power management system.

In addition, the terminal device 800 includes some functional modules that are not shown. Details are not described herein.

Optionally, an embodiment of the present disclosure further provides a terminal device, including the processor 810 and the memory 809 that are shown in FIG. 13, and a computer program stored in the memory 809 and executable on the processor 810, where the computer program, when executed by the processor 810, implements the processes of the foregoing object control method embodiments, and the same technical effects can be achieved. To avoid repetition, details are not described herein again.

An embodiment of the present disclosure further provides a computer readable storage medium. The computer readable storage medium stores a computer program, the computer program, when executed by a processor, implements the processes of the foregoing embodiments of the object control method, and same technical effects can be achieved. To avoid repetition, details are not described herein again. The computer readable storage medium may include a read-only memory (ROM), a random-access memory (RAM), a magnetic disk, an optical disc, and the like.

It should be noted that, in this specification, the terms "include", "comprise", or any of their variants are intended to cover a non-exclusive inclusion, so that a process, a method, an article, or an apparatus that includes a list of elements not only includes those elements but further includes other elements that are not expressly listed, or further includes elements inherent to such a process, method, article, or apparatus. An element limited by "includes a . . . " does not, without more constraints, preclude the presence of additional identical elements in the process, method, article, or apparatus that includes the element.

According to the foregoing descriptions of the implementations, a person skilled in the art may clearly understand that the foregoing methods in the embodiments may be implemented by using software plus a required universal hardware platform, or certainly may be implemented by using hardware. However, in many cases, the former is a better implementation. Based on such an understanding, the technical solutions of the present disclosure essentially or the part contributing to the related art may be implemented in a form of a software product. The computer software product is stored in a storage medium (such as a ROM/RAM, a magnetic disk, or an optical disc), and includes several instructions for instructing a terminal device (which may be a mobile phone, a computer, a server, an air conditioner, a network device, or the like) to perform the methods disclosed in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

What is claimed is:

1. An object control method performed by a multi-screen terminal device, wherein the multi-screen terminal device comprises at least two screens including a first screen and a second screen physically connected to the first screen, and the method comprises:
   receiving a user's first input on a first object in the first screen and a target manipulation control in the first screen,
      wherein the target manipulation control comprises one or more objects corresponding to one or more objects in the second screen, and the second screen is a screen, among the at least two screens, other than the first screen,
      wherein the first object is an object in the target manipulation control or an object in a target area, and the target area is an area on the first screen other than an area where the target manipulation control is located; and
   executing, on the first screen and in response to the first input, a first action corresponding to the first input on the first object.

2. The object control method according to claim 1, wherein the first object is an object in the target manipulation control, and the first action comprises any one of the following: displaying, on an area corresponding to the target manipulation control, an interface corresponding to the first object, moving the first object from the target manipulation control to the target area, and moving the first object from a first position in the target manipulation control to a second position in the target manipulation control;
   or
   the first object is an object in the target area, and the first action comprises: moving the first object from the target area to the target manipulation control.

3. The object control method according to claim 2, wherein, after receiving the user's first input on the target manipulation control and the first object in the first screen, the method further comprises:
   displaying, on the second screen and in response to the first input, a result of executing the first action on the first object.

4. The object control method according to claim 1, wherein, before receiving the user's first input on the target manipulation control and the first object in the first screen, the method further comprises:
   receiving a user's second input on the target manipulation control; and
   updating, in response to the second input, a display mode of the target manipulation control from a first display mode to a second display mode, wherein at least one second object is displayed in the target manipulation control in the second display mode, and the at least one second object is an object in the second screen.

5. The object control method according to claim 4, wherein the target manipulation control in the first display mode is a folder identifier, and the target manipulation control in the second display mode is a display interface.

6. A multi-screen terminal device, comprising at least two screens including a first screen and a second screen physically connected to the first screen, a processor, a memory, and a computer program stored in the memory and executable on the processor, wherein the computer program, when executed by the processor, implements an object control method that comprises:
   receiving a user's first input on a first object in the first screen and a target manipulation control in the first screen, wherein the target manipulation control comprises one or more objects corresponding to one or more objects in the second screen, and the second screen is a screen, among the at least two screens, other than the first screen, wherein the first object is an object in the target manipulation control or an object in a target area, and the target area is an area on the first screen other than an area where the target manipulation control is located; and executing, on the first screen and in response to the first input, a first action corresponding to the first input on the first object.

7. The multi-screen terminal device according to claim 6, wherein the first object is an object in the target manipulation control, and the first action comprises any one of the following: displaying, on an area corresponding to the target manipulation control, an interface corresponding to the first object, moving the first object from the target manipulation control to the target area, and moving the first object from a first position in the target manipulation control to a second position in the target manipulation control;

or the first object is an object in the target area, and the first action comprises: moving the first object from the target area to the target manipulation control.

8. The multi-screen terminal device according to claim 7, wherein, after receiving the user's first input on the target manipulation control and the first object in the first screen, the method further comprises:

displaying, on the second screen and in response to the first input, a result of executing the first action on the first object.

9. The multi-screen terminal device according to claim 6, wherein, before receiving the user's first input on the target manipulation control and the first object in the first screen, the method further comprises:

receiving a user's second input on the target manipulation control; and updating, in response to the second input, a display mode of the target manipulation control from a first display mode to a second display mode, wherein at least one second object is displayed in the target manipulation control in the second display mode, and the at least one second object is an object in the second screen.

10. The multi-screen terminal device according to claim 9, wherein the target manipulation control in the first display mode is a folder identifier, and the target manipulation control in the second display mode is a display interface.

11. A non-transitory computer-readable storage medium, wherein the non-transitory computer-readable storage medium stores a computer program, and when a processor executes the computer program, an object control method for a multi-screen terminal device is implemented, wherein the multi-screen terminal device comprises at least two screens including a first screen and a second screen physically connected to the first screen, and the method comprises:

receiving a user's first input on a first object in the first screen and a target manipulation control in the first screen, wherein the target manipulation control comprises one or more objects corresponding to one or more objects in the second screen, and the second screen is a screen, among the at least two screens, other than the first screen, wherein the first object is an object in the target manipulation control or an object in a target area, and the target area is an area on the first screen other than an area where the target manipulation control is located; and executing, on the first screen and in response to the first input, a first action corresponding to the first input on the first object.

12. The non-transitory computer-readable storage medium according to claim 11, wherein the first object is an object in the target manipulation control, and the first action comprises any one of the following: displaying, on an area corresponding to the target manipulation control, an interface corresponding to the first object, moving the first object from the target manipulation control to the target area, and moving the first object from a first position in the target manipulation control to a second position in the target manipulation control;

or the first object is an object in the target area, and the first action comprises: moving the first object from the target area to the target manipulation control.

13. The non-transitory computer-readable storage medium according to claim 12, wherein, after receiving the user's first input on the target manipulation control and the first object in the first screen, the method further comprises:

displaying, on the second screen and in response to the first input, a result of executing the first action on the first object.

14. The non-transitory computer-readable storage medium according to claim 11, wherein, before receiving the user's first input on the target manipulation control and the first object in the first screen, the method further comprises:

receiving a user's second input on the target manipulation control; and updating, in response to the second input, a display mode of the target manipulation control from a first display mode to a second display mode, wherein at least one second object is displayed in the target manipulation control in the second display mode, and the at least one second object is an object in the second screen.

15. The non-transitory computer-readable storage medium according to claim 14, wherein the target manipulation control in the first display mode is a folder identifier, and the target manipulation control in the second display mode is a display interface.

\* \* \* \* \*